US010102650B2

(12) United States Patent
Rong et al.

(10) Patent No.: US 10,102,650 B2
(45) Date of Patent: Oct. 16, 2018

(54) MODEL-BASED SCATTER CORRECTION FOR NON-PARALLEL-HOLE COLLIMATORS

(71) Applicant: Siemens Medical Solutions USA, Inc., Malvern, PA (US)

(72) Inventors: Xing Rong, Schaumburg, IL (US); Alexander Hans Vija, Evanston, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 15/601,244

(22) Filed: May 22, 2017

(65) Prior Publication Data

US 2018/0061089 A1    Mar. 1, 2018

Related U.S. Application Data

(60) Provisional application No. 62/382,098, filed on Aug. 31, 2016.

(51) Int. Cl.
| | |
|---|---|
| *G01T 1/166* | (2006.01) |
| *G06T 11/00* | (2006.01) |
| *G01T 1/164* | (2006.01) |
| *G01T 7/00* | (2006.01) |
| *G21K 1/02* | (2006.01) |

(52) U.S. Cl.
CPC .......... *G06T 11/005* (2013.01); *G01T 1/1642* (2013.01); *G01T 7/00* (2013.01); *G21K 1/02* (2013.01); *G06T 2210/41* (2013.01); *G06T 2211/424* (2013.01)

(58) Field of Classification Search
CPC ..... A61B 6/483; A61B 6/5282; G06T 11/005; G06T 2207/10081
See application file for complete search history.

(56) References Cited

U.S. PATENT DOCUMENTS

| | | | |
|---|---|---|---|
| 4,670,657 | A | 6/1987 | Hawman et al. |
| 4,823,017 | A | 4/1989 | Hsieh |
| 8,294,109 | B2 | 10/2012 | Vija |
| 8,315,428 | B2 | 11/2012 | Ding et al. |
| 8,340,386 | B2 | 12/2012 | Malmin |
| 8,466,925 | B2 | 6/2013 | Malmin |

(Continued)

OTHER PUBLICATIONS

"A slice-by-slice blurring model and kernel evaluation using the Klein-Nishina formula for 30 scatter compensation in parallel and converging beam SPECT", Phys. Med. Biol. 45 1275 (2000) to Bai (hereinafter "Bai").*

(Continued)

*Primary Examiner* — Kenneth J Malkowski

(57) ABSTRACT

Model-based scatter correction is used in SPECT with a non-parallel-hole collimator. Model-based scatter correction uses scatter kernels based on simulation to model the scatter for a given system and patient. For non-parallel-hole collimators, the measured sensitivity and measured vector maps are used in the modeling of scatter. The measured sensitivity is used to normalize the scatter kernels simulated for a parallel-hole collimator rather than attempting to simulate scatter with the complicated arrangement of holes. The measured vector maps are used to accurately project the model-based scatter sources into a data or emissions space.

15 Claims, 3 Drawing Sheets

(56) References Cited

U.S. PATENT DOCUMENTS

| | | |
|---|---|---|
| 8,467,584 B2 | 6/2013 | Vija |
| 8,483,460 B2 | 7/2013 | Malmin |
| 9,279,887 B2 | 3/2016 | Yahil |
| 2013/0077846 A1* | 3/2013 | Malmin .................. G06K 9/00 382/131 |

OTHER PUBLICATIONS

Frey, E. C., and B. M. W. Tsui. "Parameterization of the scatter response function in SPECT imaging using Monte Carlo simulation." IEEE transactions on nuclear science 37.3 (1990): 1308-1315.

Vija, A. H., et al. "A method for improving the efficiency of myocardial perfusion imaging using conventional SPECT and SPECT/CT imaging systems." Nuclear Science Symposium Conference Record (NSS/MIC), 2010 IEEE. IEEE, 2010.

\* cited by examiner

MODEL-BASED SCATTER CORRECTION FOR NON-PARALLEL-HOLE COLLIMATORS

RELATED APPLICATIONS

The present patent document claims the benefit of the filing date under 35 U.S.C. § 119(e) of Provisional U.S. Patent Application Ser. No. 62/382,098, filed Aug. 31, 2016, which is hereby incorporated by reference.

BACKGROUND

The present embodiments relate to single photon emission computed tomography (SPECT). In particular, the effects of scatter are reduced in SPECT.

In SPECT, a radioactive substance is administered to a patient. An imaging detector detects, through a collimator, some of the γ-radiation emitted from the patient. The detected emissions are tomographically reconstructed to generate an image object of locations of the emissions in a patient. Due to the gamma radiation scattering, some of the detections are of scatter rather than direct or primary photon emissions. This scattering degrades the SPECT image, so is to be reduced. The collimator typically has parallel holes to filter out photons that are not from particular directions. The scattering process is typically Compton scattering, which relates a change in direction with a reduction of energy as described by the Compton scattering formula. Scattered photons can fulfill the directionality condition as imposed the specific collimator, and it may even fulfill the energy acceptance conditions. Typically the energy window must be set large enough to allow for all primary photons to enter, however a large fraction of all detected counts are scattered photons. From simulations, the scatter fraction in the photo peak may be as high as 50% or more.

Scatter may be a problem for collimators with non-parallel holes (non-parallel-hole collimators). Non-parallel-hole collimators are usually used to achieve better tradeoff between sensitivity and resolution for imaging certain organs (e.g., heart, thyroid and brain). The non-parallel-hole collimators greatly increase the difficulty in accurate modeling of the image formation process, including scatter. Thus, the quantitative accuracy of SPECT imaging using non-parallel-hole collimators is usually poor.

To improve the image formation process, energy-window based scatter correction has been used for non-parallel-hole collimators. The scatter at energy windows adjacent to but not at an energy window for the primary photons is measured. The scatter at the energy window for the primary photons is estimated by linear interpolation from the scatter in the adjacent windows. This estimate is used in image formation to reduce the contribution of scatter. This-energy window type of scatter correction may be inaccurate or rely on assumption in interpolation that are not true.

SUMMARY

By way of introduction, the preferred embodiments described below include methods, systems, and non-transitory computer readable media for model-based scatter correction in SPECT with a non-parallel-hole collimator. Model-based scatter correction uses scatter kernels based on simulation to model the scatter for a given system and patient. For non-parallel-hole collimators, the measured sensitivity and measured vector maps are used in the modeling of scatter. The measured sensitivity is used to normalize the scatter kernels simulated for a parallel-hole collimator rather than attempting to simulate scatter with the complicated arrangement of holes. The measured vector maps are used to accurately project the model-based scatter sources into a data or emissions space.

In a first aspect, a method is provided for model-based scatter correction in a SPECT system. A SPECT detector having a non-parallel-hole collimator detects emissions from a patient. An image object is generated from the emissions. The image object is forward projected to a first data model in data space. A model-based scatter source is formed from convolution of the image object with scatter kernels. The scatter kernels are kernels from a simulation of scatter with a parallel hole collimator normalized by sensitivity as a function of location measured for the non-parallel-hole collimator. A model of scatter is determined from a vector map measured from the non-parallel-hole collimator and the model-based scatter source. The first data model is combined with the model of scatter into a projection data model. A SPECT image of the patient is displayed and is a function of the projection data model.

In a second aspect, a method is provided for model-based scatter correction in a SPECT system. Scatter kernels simulated with a parallel-hole collimator are normalized by a measured sensitivity for a non-parallel-hole collimator. Scatter is corrected in SPECT reconstruction with the normalized scatter kernels. A SPECT image is generated for a patient from the SPECT reconstruction as corrected for scatter.

In a third aspect, a system includes a non-parallel-hole collimator and a detector for detecting emissions from a patient. The detector is adjacent to the non-parallel-hole collimator. A reconstruction processor is configured to reconstruct a three-dimensional activity distribution of the emissions from the patient. The reconstruction includes model-based scatter correction accounting for the non-parallel-hole collimator. A display is configured to display an image of the three-dimensional activity distribution.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Iterative SPECT reconstruction uses model-based scatter correction for non-parallel-hole collimators instead of attempting to simulate scatter for each patient-SPECT system combination and instead of using energy-window-based scatter correction. The model-based scatter correction is altered to account for the non-parallel-hole collimator. The alteration accurately and practically account for the effects of non-parallel-hole collimators on scatter components by separating the modeling into two steps. In a first step, the effects of non-parallel-hole collimators on scatter kernels are eliminated by simulating an ideal parallel-hole collimator and normalizing the kernels resulting from simulation by sensitivity of the non-parallel-hole collimator. In a second step, the effects of non-parallel-hole collimators on scatter components during the forward radiation transfer process are accounted for using a combination of a model-based scatter source generated from the normalized scatter kernels and vector maps of the non-parallel-hole collimator. The model of scatter separates the image formation model for scattered photons from unscattered photons.

By improving the accuracy in the image formation model using model-based scatter correction, accurate quantification for SPECT imaging may be provided using non-parallel-hole collimators. For example, coronary flow reserve (CFR) may provide additional information for better diagnosis of heart disease. Accurate quantitative imaging is a prerequisite for measuring CFR. SPECT systems using non-parallel-hole collimators (e.g., IQSPECT) may achieve better trade-off between sensitivity and resolution compared to parallel-hole collimators. The quantitative accuracy provided by model-based scatter correction with the non-parallel-hole collimator may allow for accurate CFR. Another important application may be I-123 DatScan for diagnosing Parkinson's disease. Using non-parallel-hole collimators with model-based scatter correction may provide higher resolution and better quantitative accuracy, which is beneficial to differentiating different types of Parkinson's disease. Other applications may benefit from the improved accuracy due to model-based scatter correction with non-parallel-hole collimators.

Figure 1:
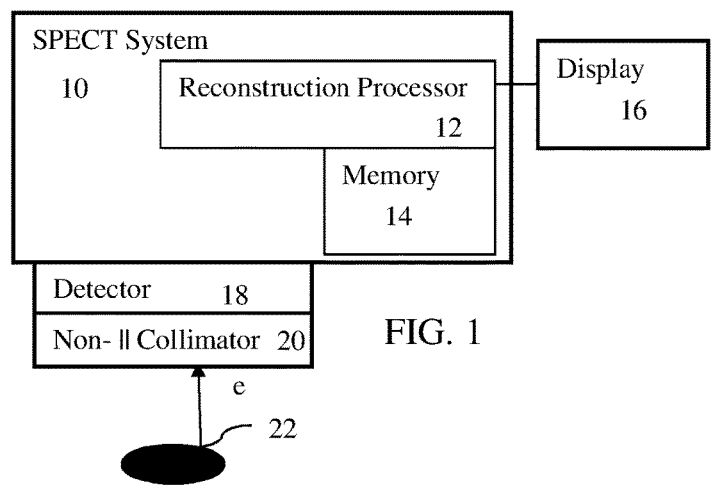
FIG. 1 is a block diagram of a SPECT system, according to one embodiment, for model-based scatter correction for a non-parallel-hole collimator.

FIG. 1 shows a SPECT system 10. Any now known or later developed SPECT system 10 may be used. The SPECT system 10 detects emissions due to radioactive decay in a patient. The SPECT system 10 may provide qualitative or quantitative imaging.

Figure 3:
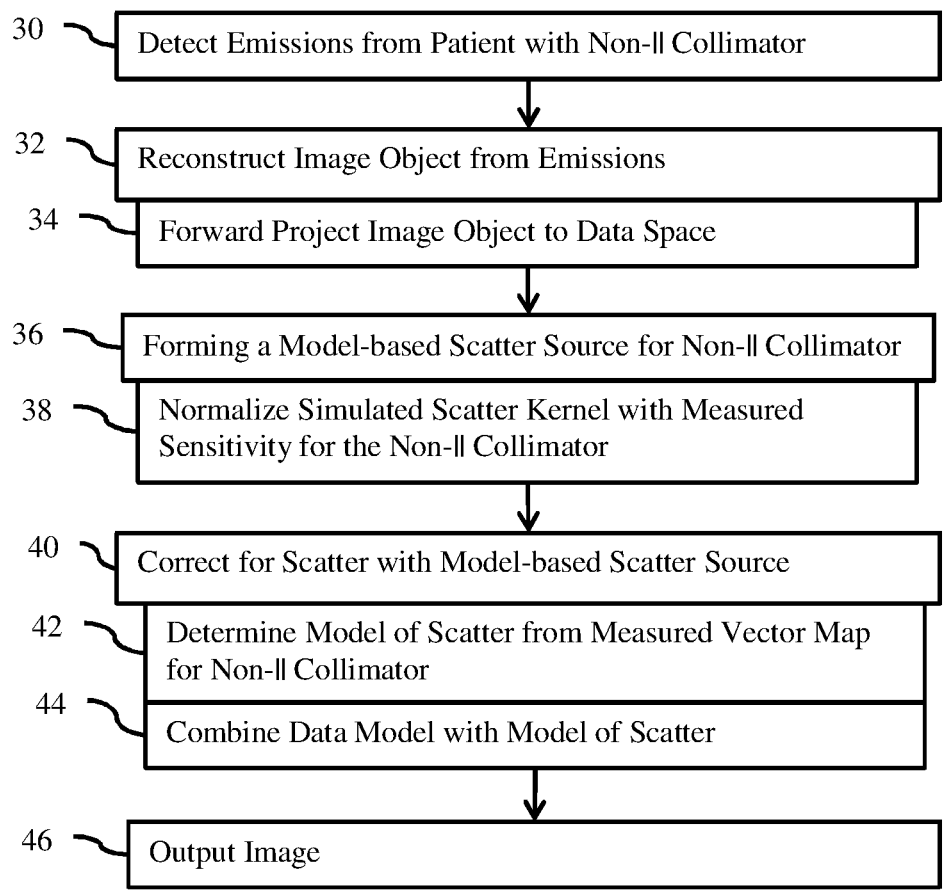
FIG. 3 is a flow chart diagram of one embodiment of a method for model-based scatter correction in a SPECT system with a non-parallel-hole collimator.
Figure 4:
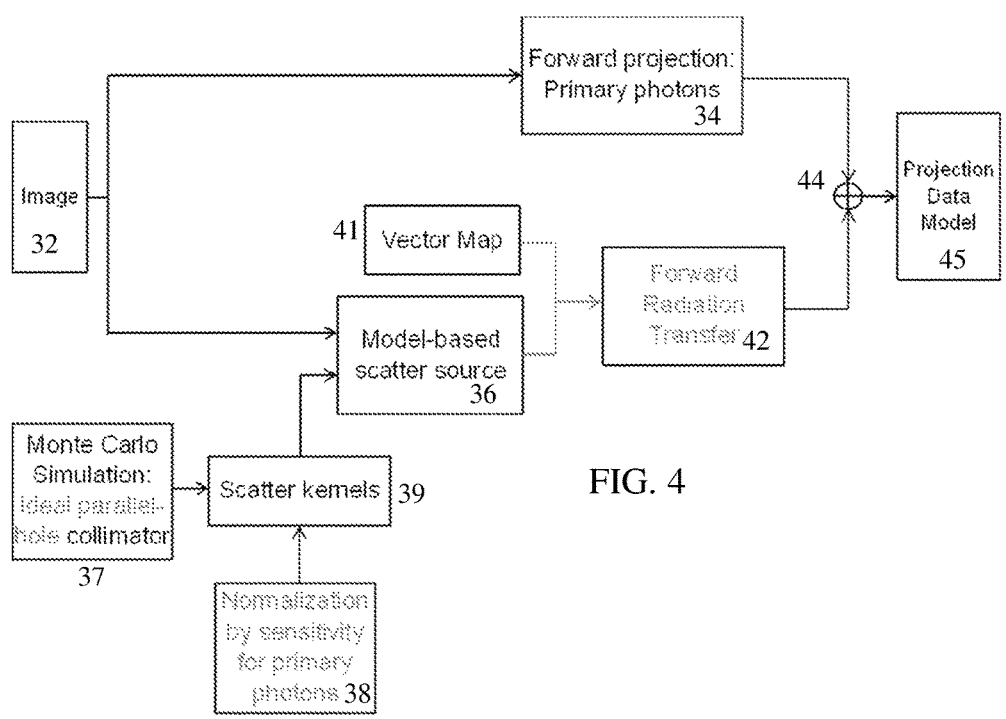
FIG. 4 is flow chart diagram of another embodiment of a method for model-based scatter correction in a SPECT system with a non-parallel-hole collimator.

The SPECT system 10 implements the method of FIG. 3, the method of FIG. 4, or another method. Model-based scatter correction is used with the non-parallel-hole collimator 20 for imaging a patient.

The SPECT system 10 includes a reconstruction processor 12, a memory 14, a display 16, a detector 18, and the non-parallel-hole collimator 20. The processor 12, memory 14, and/or display 16 are part of the imaging system with the detector 18 or are separate (e.g., a computer or workstation). Additional, different, or fewer components may be provided. For example, the system 10 is a computer without the detector 18 and the non-parallel-hole collimator 20. As another example, user input, patient bed, x-ray scanner, computed tomography (CT) scanner, or other SPECT imaging-related devices are provided. Other parts of the system 10 may include power supplies, communications systems, and user interface systems.

The non-parallel-hole collimator 20 is lead or other material for blocking gamma radiation resulting from emissions in the patient. A slab of material extending over the surface of the detector 18 is provided. The surface facing the patient of the non-parallel-hole collimator 20 is flat over a two-dimensional area, but may have surface curvature in other embodiments. Square, rectangular, hexagonal, circular, or other surface area shapes may be provided. The non-parallel-hole collimator 20 is of any uniform or varying thickness, may contact or be spaced from the detector 18, and is positioned so that photons arriving at the detector 18 pass through the non-parallel-hole collimator 20.

A plurality of holes is in the non-parallel-hole collimator 20. The holes are circular, but may be hexagonal or other shapes. Fan-beam shapes, elongated shapes, or other hole shapes may be used. The holes are cylindrical channels or other shapes with parallel walls, but conical or other non-parallel wall shapes for the channels may be used. Uniform or non-uniform spacing of holes is provided across the non-parallel-hole collimator.

The holes extend through the non-parallel-hole collimator 20, providing channels through which photon from the emissions may pass to reach the detector 18. Any photons arriving at a hole at a generally non-parallel angle to the hole are blocked from reaching the detector. "Generally" is used to account for a range of acceptance angles (e.g., +/−2 degrees) due to the hole size. Any photons arriving at a hole at a generally parallel angle to the hole pass through and arrive at the detector 18.

The holes are non-parallel. Any range of deviation from parallel may be used, such as +/−5, 10, 15, or 25 degrees. Any variation as a function of locations across the non-parallel-hole collimator 20 may be used. For example, the non-parallel-hole collimator 20 is a multi-focal collimator where two or more focal regions or one focal region and a generally non-focused (e.g., infinite focus) is also provided. Some of the holes may be parallel or closer to parallel than other holes and corresponding channels. For example, the holes around the edges of the collimator are parallel and at least some of the holes inward from the edges are non-parallel with the holes and channels on the edges. This may allow a greater concentration of emissions from one or more regions to be counted.

Figure 2:
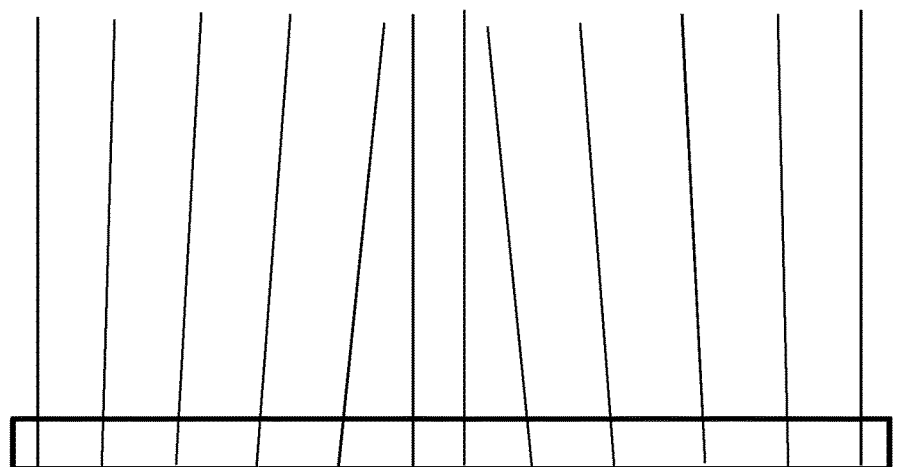
FIG. 2 illustrates an example of lines of response for a non-parallel-hole collimator.

FIG. 2 shows an example non-parallel-hole collimator 20 in cross-section. Sample lines of response are shown extending along the channels through the holes and into a patient space. The lines of response are non-parallel to each other due to the non-parallel-holes of the non-parallel-hole collimator 20. The lines of response inward from the two edges of the cross-section angle towards a region spaced from the non-parallel-hole collimator 20. The lines of response on the edges and at the center are parallel to each other. Any variation in angles across one or more dimensions of the surface of the non-parallel-hole collimator 20 may be used. Other arrangements of lines of response may be provided.

The detector 18 is a gamma camera connected with a gantry. The gamma camera is a planar photon detector, such as having crystals or scintillators with photomultiplier tubes, SiPM, or another optical detector. Direct (e.g., CZT) or indirect (e.g., with scintillation crystals) detectors may be used. The gantry rotates the gamma camera about the patient. Other structures of detectors may be used.

The detector 18 is adjacent to the non-parallel-hole collimator 20. The non-parallel-hole collimator 20 rests against or contacts the detector 18. Spacers or standoffs may connect the non-parallel-hole collimator 20 to the detector 18. Alternatively, the non-parallel-hole collimator 20 is positioned against or away from the detector 18 by any connection (e.g., direct or indirect) but sufficiently adjacent that photons that arrive at the detection surface of the detector 18 (e.g., arrive at the scintillation crystals) from the patient pass through the non-parallel-hole collimator 20.

The SPECT system 10, using the detector 18, detects emissions from the patient 22 for measuring uptake or physiological function. During scanning of a patient, the detector 18 detects emission events. The emissions occur from any location in a finite source (i.e., the patient). The radiotracer in the patient migrates to, connects with, or otherwise concentrates at specific types of tissue or locations associated with specific biochemical reactions. Thus, a greater number of emissions occur from locations of that type of tissue or reaction. As a gamma camera moved to different locations relative to the patient, the detector 18 detects emission events at different positions or angles relative to the patient, forming lines of response for the events. The patient bed may move to define a field of view relative to the patient.

The reconstruction processor 12 is a general processor, digital signal processor, graphics processing unit, application specific integrated circuit, field programmable gate array, digital circuit, analog circuit, combinations thereof, or other now known or later developed device for reconstructing an image object from detected emissions. The reconstruction processor 12 is a single device, a plurality of devices, or a network. For more than one device, parallel or sequential division of processing may be used. Different devices making up the reconstruction processor 12 may perform different functions, such as one processor (e.g., application specific integrated circuit or field programmable gate array) for reconstructing the object and another (e.g., graphics processing unit) for rendering an image from the reconstructed image object. In one embodiment, the reconstruction processor 12 is a control processor or other processor of SPECT system 10. In other embodiments, the reconstruction processor 12 is part of a separate workstation or computer.

The reconstruction processor 12 operates pursuant to stored instructions to perform various acts described herein, such as reconstructing of act 32, forming the model-based scatter source of act 36, correcting for scatter of act 40, and generating an image of act 46.

The reconstruction processor 12 is configured by software, firmware, and/or hardware to reconstruct a volume or object (e.g., three-dimensional activity distribution) from emissions. Any reconstruction may be used to estimate the activity concentration or distribution of the tracer in the patient. The reconstruction processor 12 accesses the detected emission events from the memory 14, from the detector 18, or buffers to reconstruct. The detected emissions are used to reconstruct the distribution of the radioisotope in three dimensions.

For reconstruction, forward and backward projection are used iteratively until a merit function indicates completion of the reconstruction (i.e., a best or sufficient match of the image object to the detected emissions). The forward projection uses system information to project a currently estimated activity distribution in object or image space to a data space corresponding to detected emissions along lines of response. For a first instance, an initial distribution of activity in the image or object space is used or estimated from the detected emissions. Residuals between the forward projection and the detected emissions are determined. The backward projection transforms the residuals from the data space to the image or object space. By repeating the forward and backward projections, a series of distributions of activities result. Once a stop criterion or criteria are met in the reconstruction, then the resulting activity distribution is used for SPECT imaging.

As part of reconstruction, the reconstruction processor 12 accounts for the non-parallel-hole collimator 20 with model-based scatter correction. The scatter correction is performed as part of the forward projection from the image or object space to the data space. The scatter correction model is used in applying the image formation process to the activity distribution. The resulting projection data model has reduced scatter.

For scatter correction, a scatter response function (SRF) is combined with the activity distribution of the patient to form a model-based scatter source. The SRF is represented by scatter kernels. The reconstruction processor 12 convolves the scatter kernels with the activity distribution to create the model-based scatter source. The scatter kernels for the given SPECT system 10 are used. These system-specific scatter kernels are stored in the memory 14 and were created based on simulation of scatter with a parallel-hole collimator. The kernels from the simulation do not account for the non-parallel-hole collimator 20, but the simulation is more efficiently performed with an ideal parallel-hole collimator. To make the kernels specific to a given SPECT system 10, the simulated kernels are normalized by sensitivity of the non-parallel-hole collimator 20. The sensitivity as a function of location on the surface of the non-parallel-hole collimator 20 is measured. This measured sensitivity is used to normalize across the kernels, adapting the scatter kernels and resulting SRF to the specific non-parallel-hole collimator 20.

The reconstruction processor 12 is further configured to combine the model-based scatter source generated from the scatter kernels and vector maps measured for the non-parallel-hole collimator 20. For forward radiation transfer of the scatter model to the data space, the vector maps for the non-parallel-hole collimator 20 are used. These vector maps define the acceptance angles and/or lines of response along which the forward projections occur. The model-based scatter source is used to model detection of scatter by the SPECT system 10. This detection is modeled as the forward radiation transfer to create the model of scatter in the data space. The reconstruction processor 12 then combines the forward projection of the activity distribution with the model of scatter to reduce the scatter in the resulting projection data model.

The reconstruction processor 12 generates one or more images based on the reconstruction. Any given image represents the emissions from the patient. The image shows the spatial distribution, such as with a multi-planar reconstruction or a volume rendering. For quantitative imaging, the image represents accurate measures (e.g., in Bq/ml) of the activity concentration. Alternatively or additionally, the image shows a quantity or quantities (e.g., alphanumeric) representing the activity concentration or specific uptake values for one or more locations or regions.

The display 16 is a CRT, LCD, plasma screen, projector, printer, or other output device for showing an image. The display 16 displays an image of the reconstructed functional volume. The image is of or part of the three-dimensional activity distribution. A three-dimensional rendering, multi-planar reconstruction, cross-section or other type of image of the activity distribution in the patient is displayed.

The memory 14 is a buffer, cache, RAM, removable media, hard drive, magnetic, optical, database, or other now known or later developed memory. The memory 14 is a single device or group of two or more devices. The memory 14 is part of the SPECT system 10 or a remote workstation or database, such as a PACS memory.

The detected emission events, counts, location, or other detection information are stored in the memory 14. The memory 14 may store data at different stages of processing, such as a data model, residuals, image or object representation (i.e., activity distribution), filtered data, thresholded data, results from morphological processing, masks, scatter kernels, vector maps, model-based scatter source, model of scatter, or other data. Projection operators, transposed operators, a measure of completeness of reconstruction, merit function data, the reconstructed object, system matrix, thresholds, results of calculations, an image to be displayed, an already displayed image, or other data may be stored. The data is stored in any format.

The memory 14 is additionally or alternatively a non-transitory computer readable storage medium with processing instructions. The memory 14 stores data representing instructions executable by the programmed processor 12. The instructions for implementing the processes, methods, and/or techniques discussed herein are provided on non-transitory computer-readable storage media or memories, such as a cache, buffer, RAM, removable media, hard drive, or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

FIG. 3 show one embodiment of a method for model-based scatter correction in a SPECT system. The model-based scatter correction is performed for a non-parallel-hole collimator. The scatter correction is specific to the non-parallel-hole collimator. Scatter kernels are adapted to account for the non-parallel-hole collimator, allowing use of simulation of scatter with a simulated parallel-hole collimator. The measured vector maps for the non-parallel-hole collimator are further used to adapt the model-based scatter correction to the non-parallel-hole collimator.

FIG. 4 shows another representation of the method. The methods of FIGS. 3 and 4 implement model-based scatter correction with the image forming process accounting for the non-parallel-hole collimator. As part of iterative reconstruction, the methods generate the image object from the emissions, forward project the image object, and combine the model of scatter with the forward projection of the image object. Once reconstructed with scatter reduction based on the model of scatter, a SPECT image resulting from image object from the iterative reconstruction is displayed. In this reconstruction process, the model of scatter is applied as part of transforming in one or multiple (e.g., all) instances (e.g., iterations) from the image object to the projection data model. FIGS. 3 and 4 are directed to acts in this transformation.

The method is implemented by a SPECT system, such as the SPECT system of FIG. 1. The SPECT system includes a non-parallel-hole collimator, so the modeling of scatter accounts for this non-parallel-hole collimator in the image formation process. A detector, such as a gamma camera with the non-parallel-hole collimator, detects emissions in act 30, a reconstruction processor performs acts 32-44, and a display, memory interface, or network interface is used for act 46. Other devices may be used to perform any of the acts, such as act 38 being performed by a separate processor and the resulting scatter kernels stored in memory are used by the reconstruction processor in act 36.

The acts are performed in the order shown (e.g., top to bottom or numerical for FIG. 3 or along the arrows for FIG. 4) or other orders. Additional, different, or fewer acts may be performed. For example, act 30 is not provided where the detected emissions are stored or transferred from memory. As another example, act 38 is not performed where the stored scatter kernels of the model of scatter are previously normalized. In other examples, an act for backward projection is provided as part of the reconstruction of act 32.

In act 30, emissions from a patient are detected. The activity concentration in a patient having received a radiotracer is determined as part of reconstruction. After ingesting or injecting the radiotracer into the patient, the patient is positioned relative to a detector, and/or the detector is positioned relative to the patient. For SPECT, the detector may be rotated or moved relative to the patient, allowing detection of emissions from different angles and/or locations in the patient. Emissions from the radiotracer within the patient are detected over time.

A non-parallel-hole collimator in front of the detector limits the direction of photons detected by the detector, so each detected emission is associated with an energy and line of response (e.g., a cone of possible locations from which the emission occurred). Any multi-focal or other arrangement of non-parallel holes may be used to limit the directions from which emissions are detected. For example, the emissions are detected along lines of response that are more parallel with each other at the edges of the planar array of the gamma camera than other lines of response more inward. The angles of the holes of the collimator determine the lines of response. Plane, fan beams, or cones of response with spatial variance in orientation may be used.

In act 32, a reconstruction processor reconstructs an image object from acquired projection data. Computed tomography implements reconstruction to determine a spatial distribution (i.e., activity distribution) of emissions from the detected lines of response. The projection data represents the detected emissions. The quantity or amount of uptake for each location (e.g., voxel) may be estimated as part of the reconstruction. The SPECT system may estimate the activity concentration of an injected radiopharmaceutical or tracer for different locations in a patient volume. For an initial iteration in the reconstruction, a default or other image object may be used.

An "object" or "image object" is an activity distribution in an object space (also referred to as image space) and is a reconstruction of the data set D measured in a data space. The object space is the space in which the result of the image reconstruction is defined and which corresponds to the volume that was imaged using the SPECT imaging system (e.g., the input object, such as a patient, provided to the nuclear imaging system). The image object may be a three-dimensional (3D) image object or may have any other dimensionality, e.g., for N-dimensional imaging.

Any now known or later developed reconstruction methods may be used, such as based on Maximum Likelihood Expectation Maximization (ML-EM), Ordered Subset Expectation Maximization (OSEM), penalized weighted least squares (PWLS), Maximum A Posteriori (MAP), multi-modal reconstruction, non-negative least squares (NNLS), or another approach. Different processes for dealing with motion or other sources of distortion may be used for a same method.

The reconstruction is iterative. The image reconstruction processor uses a system matrix H (or projection operators) to describe the properties of the SPECT system and uses an iteratively improved data model to calculate the image object based on the data set D of detected emissions. The iterative reconstruction forward projects a current estimate of the object or image (e.g., object or image space) to projection or data space using the system matrix or forward projectors representing the detection (e.g., image process) in act 34. The forward projection multiplies the system matrix or projection operators with the current volume to emulate the detection by the nuclear imaging system. The reconstruction includes projection operators (i.e., forward projector) that incorporate the effects of the detector on the photons (i.e., collimation and detection process) for a patient and isotope. The forward projector contains a model of the imaging formation process specific to the detector and/or imaging system. The image formation model includes the interaction of photons with patients (e.g., attenuation and scatter), the collimation-detection process (e.g., collimator detector response including collimator geometric response, septal penetration and scatter, partial deposition in crystal and detector intrinsic resolution), and related radionuclide properties (e.g., emission abundances).

The system matrix or projection operators are the mathematical representation of the projection from the object space to the projection space (e.g., forward projector). In some nuclear imaging systems, such as SPECT for small animal imaging, the system matrix is stored and used directly in each iteration to calculate the projection data model from a current estimate of the activity distribution. In most clinical nuclear imaging systems, due to the large dimension of the system matrix, the system matrix is not stored. Instead, a series of mathematical projection operators, collectively called the forward projector, are performed in each iteration. The projection operators mathematically provide multiplication by the system matrix.

In one representation for SPECT, the forward projection is an application of the system matrix H to an object in object space. Projecting an estimated image $I_\alpha$ (where a represents a measurement angle) into data space results in a data model $M_i$ of that estimated image:

$$M_i = \sum_\alpha H_{i\alpha} I_\alpha$$

Representing the system matrix as a product of operators yields $$H = H_{x\Theta\square-} \otimes H_{2\Theta H_1}$$

Other representations may be used.

The forward projection of act 34 may be limited to emissions at particular energies. An energy window associated with emissions of the radionucleotide used for the patient is used. The energy window is set around the photon energy of the non-scatter emissions from the radionucleotide. Emissions at energies outside this primary photon window are likely scatter or from other sources, so are not to be used. Emissions within the energy window are more likely from the radionucleotide, but may include first, second, third or other orders of scatter from any source.

Since the detected emissions are in a projection space (e.g., generally known location in two-dimensions but not three), the forward projection of the current volume is compared to the detected or measured emissions. This comparison is tested for accuracy with a merit function (e.g., ML-EM, NNLS, or Mighell chi square). If sufficiently accurate and/or having no further increase in accuracy, the iteration ceases and the current image object is output as the reconstructed image object. If the merit function indicates insufficient or improving accuracy, a difference or residual between the forward projection and the detected emissions is backward projected. This backward projection provides a gradient or change for the image object. The direction and step size is determined for the change and is applied to update the image object. The process is then repeated for another iteration of the reconstruction. Once complete, an image object I, which may be an N-dimensional image object (typically N=3 in medical imaging applications), may then be displayed on a display using a volume rendering or other imaging technique.

The scatter model is applied in parallel with the forward projection operation of act 34, so the scatter in the object space is transformed into the data space for combination with the forward projection resulting from act 34. The data model is adjusted or includes correction for scatter prior to testing with the merit function.

For use on a SPECT system, the scatter correction is desired to be an accurate and practical method to account for the effects of non-parallel-hole collimators on scatter components. Energy window-based scatter correction may be inaccurate. Simulation of scatter with the non-parallel-hole collimator for each system may be impractical. Instead, model-based scatter correction is used. To account for the non-parallel-hole collimator, the model-based scatter correction is separated in two ways. Act 38 represent one way, and act 42 represents another way.

In act 36, the reconstruction processor forms a model-based scatter source. This model-based scatter source is specific to the non-parallel-hole collimator and the patient, so uses the non-parallel-hole collimator specific scatter kernels 39 and the patient-specific activity distribution 32 as inputs. To form the model-based scatter source, the scatter kernels are convolved with the activity distribution 32 (i.e., image object). A library of points in material are simulated, such as with Monte Carlo simulation. If the material is known or assumed, the appropriate kernels are convolved given the material present. Another method is brute force computation of Monte Carlo, which is very compute intensive.

The scatter kernels 39 represent the scatter response function of the detection with the non-parallel-hole collimator. In act 37, the interaction of scatter resulting from different sources with a detector and collimator are simulated. Any type of simulation may be used. Monte Carlo or other stochastic simulation may be used. To keep the processing burden reasonable given stochastic simulation, the collimator in the simulation is treated as an ideal parallel-hole collimator. Non-ideal may be used for the parallel-hole collimator, such as to account for conical lines of response due to the finite size of the holes.

The simulation is performed for all systems of a given type, such as all SPECT systems using a same combination of collimator and detector. The simulation is for that combination, such as based at least in part of the size, shape, and/or material characteristics of the collimator and detector. The simulation is not performed by the SPECT system 10, but by a computer, workstation, or server. Alternatively, the SPECT system 10 performs the simulation. The results of the simulation are scatter kernels for the parallel-hole collimator and detector combination. The scatter kernels model the common physics in the image formation process for scatter.

The simulation is for a given radiotracer. The simulation provides for the source or sources to emit at the energy level for the primary photons. An energy window may or may not be used in the simulation. In alternative embodiments, the simulation provides scatter kernels for different energy levels.

To adapt the scatter kernels to the non-parallel-hole collimator, the scatter kernels from the simulation are normalized by sensitivity of the non-parallel-hole collimator. This normalization adjusts the scatter kernels based on the sensitivity.

The sensitivity of the non-parallel-hole collimator varies across the non-parallel-hole collimator at act 38. Due to the variation in the angles, distribution (e.g., non-uniform), size, and/or shape of the holes, the sensitivity is different at different locations. This spatial variation in sensitivity is applied to the scatter kernels. The scatter kernels represent the image formation process, so respond to the spatial variation of sensitivity.

The sensitivity is measured for the non-parallel-hole collimator. Each non-parallel-hole collimator may have a different spatial distribution of sensitivity, even if of a same design. Manufacturing tolerances, damage, variation in installation, and/or another aspect may result in the sensitivity for a given non-parallel-hole collimator being different than the same type or part non-parallel-hole collimator in another SPECT system. The normalization by the measured sensitivity provides non-parallel-hole collimator specific scatter kernels for the one non-parallel-hole collimator. In alternative embodiments, the sensitivity is by class or type, such as providing an average sensitivity profile or by location for the part or type of non-parallel-hole collimator. This normalization by the measured sensitivity for this type provides non-parallel-hole collimator specific scatter kernels for the type. In this way, the effects of non-parallel-hole collimators are eliminated from the scatter kernels for modeling the source of scatter.

The sensitivity is measured at the energy level for the primary photons. Different sensitivities are provided for different energy levels or energy windows. The normalization is by the sensitivities for the primary photons or non-scattered energies from the radiotracer emissions.

The normalization is performed with the simulation 37 or at another time. The SPECT system may receive the normalized scatter kernels 39 for use with any number of patients. The scatter kernels 39 may be updated at a calibration of the SPECT system or are maintained. The SPECT system may not create the non-parallel-hole collimator specific scatter kernels 39. In other embodiments, the SPECT system generates the non-parallel-hole collimator specific scatter kernels 39 as needed or as part of generating the model-based scatter source in act 36.

In act 40, the model-based scatter source is used to correct for scatter in SPECT reconstruction. The model-based scatter source generated by the normalized scatter kernels is combined with vector maps 41 measured for the non-parallel-hole collimator. The combination occurs as a part of the forward radiation transfer. Scatter from the model-based scatter source is forward projected. The combination creates a model of scatter in act 42. The combination of the model-based scatter source generated from scatter kernels and vector maps 41 of the non-parallel-hole collimator is performed by ray tracing in image formation. The vector maps 41 and the model-based scatter source are convolved with a point spread function as part of the forward radiation transfer. The emissions due to any degree of scatter along the lines of response defined by the vector maps 41 are projected from the scatter source modeled as the model-based scatter source for the non-parallel-hole collimator. The forward radiation transfer for the scatter sources along lines of response defined by the vector maps 41 accounts for the effects of non-parallel-hole collimators on scatter components.

The vector maps 41 are measured for the non-parallel-hole collimator. The measurements are for the type or part number, such as being an average. Alternatively, the measurements are for a specific non-parallel-hole collimator of the SPECT system being used to scan the patient.

The model of scatter may account for patient-specific characteristics. The tissues or structures of the patient may affect the scatter. The density, attenuation, and/or absorption may be determining characteristics. A computed tomography (CT) scan of the patient may indicate density, attenuation, and/or absorption. The CT values for a volume of the patient provide patient specific characteristics for modeling scatter. These CT values are used in the model of scatter. As part of the forward radiation transfer, the CT values are used to account for the effects of the patient-specific characteristics on the scatter components. The CT values are used for attenuation correction as a depiction of deviations from water. The density or material properties may be extracted from the CT values. The scatter model may account for the density or other material properties.

In act 44, the model of scatter output in act 42 is combined with the data model output in act 34. The combination is an optimization. The reconstruction processor estimates which of the emissions of the data model from act 34 are primary photons (i.e., without scatter) and which of the emissions of the data model are from scatter. The optimization varies voxel values in the image space so that the different between the data and the data model in data space is minimized given an objective function. The combination of results of the forward radiation transfer with a forward projection from a three-dimensional activity distribution for the patient creates the projection data model 45 from the emissions without or with less scatter. The data model from the forward projection is corrected for scatter. The data model includes scatter, as does the measured data. The scatter source is treated as if there is a scatter source of which to track.

This corrected data model 45 is used to calculate residuals for back projection. The residuals are then used in the next iteration of altering the image object and forward projecting. Alternatively, the merit criterion or criteria indicate a sufficient match of the projection data model 45 with the detected emissions after correction for scatter. The image object from the sufficient match is used as the reconstruction of the activity distribution for the patient. The counts at each location in the activity distribution may be used or converted to quantification of the activity.

In act 46, a SPECT image of the patient is displayed. The SPECT system, such as the reconstruction or other processor, generates an image from the reconstruction of the activity distribution. The image is a function of the projection data model with correction for scatter from the model of scatter, accounting for the non-parallel-hole collimator. The image is displayed on the display of the SPECT system or another display.

The image may be of a quantity of activity, such as an image of an alphanumeric value (e.g., level of uptake). The image may be any SPECT image, such as a three-dimensional rendering from the reconstructed object image. An image of the patient or part of the patient is generated from the reconstruction. The results of the reconstruction represent a distribution of emissions or counts of emissions in N-dimensions. For qualitative SPECT, this distribution is used to generate an image. For quantitative SPECT, the activity concentration for each location (e.g., voxel) is determined. The reconstruction provides voxel values representing activity concentration. In one embodiment, data for one or more (e.g., multi-planar reconstruction) planes is extracted (e.g., selected and/or interpolated) from the volume or voxels and used to generate a two-dimensional image or images.

The output may be a transmission. The image transmission may be to a memory through a memory interface and/or to a patient medical record, server, or other computer connected through a network interface.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for model-based scatter correction in a single photon emission computed tomography (SPECT) system, the method comprising:
   detecting, with a SPECT detector having a non-parallel-hole collimator, emissions from a patient;
   generating an image object from the emissions;
   forward projecting from the image object to a first data model in data space;
   forming a model-based scatter source from convolution of the image object with scatter kernels, the scatter kernels being kernels from a simulation of scatter with a parallel hole collimator normalized by sensitivity as a function of location measured for the non-parallel-hole collimator;
   determining a model of scatter from a vector map measured from the non-parallel-hole collimator and the model-based scatter source;
   combining the first data model with the model of scatter into a projection data model; and
   displaying a SPECT image of the patient as a function of the projection data model.

2. The method of claim 1 wherein detecting comprises detecting with the non-parallel-hole collimator being a multi-focal collimator with holes being more parallel along edges than inward from the center of the multi-focal collimator.

3. The method of claim 1 wherein generating the image object from the emissions, forward projecting, and combining are performed as part of iterative reconstruction, the displaying being of the SPECT image resulting from the iterative reconstruction.

4. The method of claim 1 wherein forward projecting comprises transforming the image object with a system matrix for the SPECT detector.

5. The method of claim 1 wherein forward projecting comprises forward projecting the image object for energies in a window about a photon energy of non-scatter ones of the emissions.

6. The method of claim 1 wherein forming comprises forming with the simulation being a Monte Carlo simulation.

7. The method of claim 1 wherein forming comprises forming with the sensitivity for the non-parallel-hole collimator being at a photon energy for non-scatter ones of the emissions.

8. The method of claim 1 wherein forming further comprises accounting for patient-specific characteristics in scatter with computed tomography data representing the patient.

9. The method of claim 1 wherein determining comprises convolving the vector map and the model-based scatter source with a point spread function.

10. The method of claim 1 wherein determining comprises ray tracing using the model-based scatter source and the vector map.

11. The method of claim 1 wherein determining comprises forward projecting the model-based scatter source.

12. The method of claim 1 wherein combining comprises estimating which of emissions of the first data model are without scatter and which of the emissions of the first data model are from scatter, and creating the projection data model from the emissions without scatter.

13. A single photon emission computed tomography (SPECT) system comprising:
   a non-parallel-hole collimator;
   a detector for detecting emissions from a patient, the detector adjacent to the non-parallel-hole collimator;
   a reconstruction processor configured to:
      generate an image object from the emissions,
      forward project from the image object to a first data model in data space,
      form a model-based scatter source from convolution of the image object with scatter kernels, the scatter kernels being kernels from a simulation of scatter with a parallel hole collimator normalized by sensitivity as a function of location measured for the non-parallel-hole collimator,
      determine a model of scatter from a vector map measured from the non-parallel-hole collimator and the model-based scatter source, and
      combine the first data model with the model of scatter into a projection data model; and
   a display configured to display a SPECT image of the patient as a function of the projection data model.

14. The system of claim 13 wherein the non-parallel-hole collimator is a multi-focal collimator with holes being more parallel along edges than inward from the center of the multi-focal collimator.

15. The system of claim 13 wherein the non-parallel-hole collimator comprises angles of holes to form at least one of a plane, a fan beam, or a cone of response with spatial variance in orientation.

* * * * *